United States Patent Office 3,626,756
Patented Dec. 14, 1971

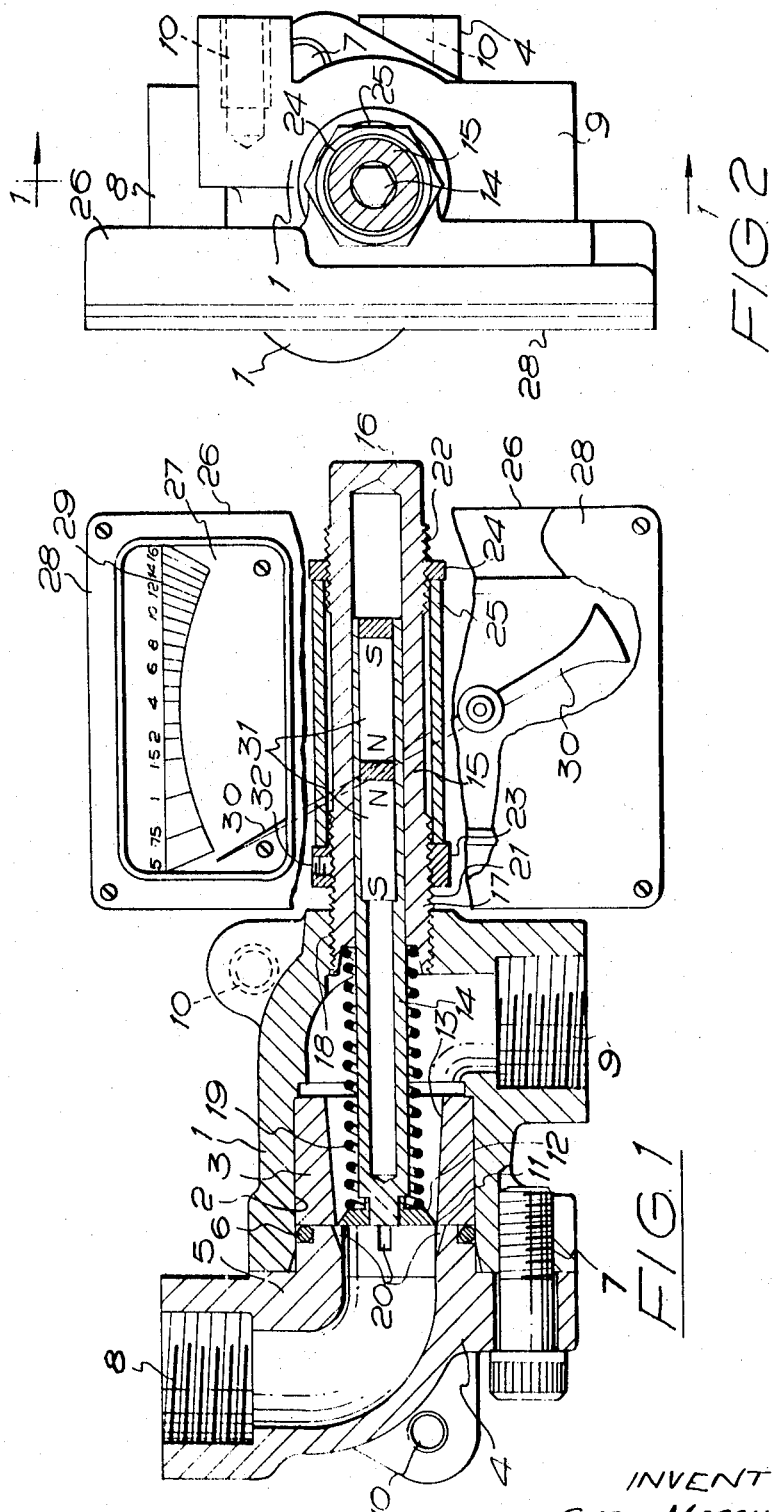

3,626,756
FLOWMETER
Cyril Marshall and Dennis A. Perry, Lenton, England, assignors to Conflow Limited
Filed Jan. 26, 1970, Ser. No. 5,719
Claims priority, application Great Britain, Jan. 29, 1969, 5,288/69
Int. Cl. G01f 1/00
U.S. Cl. 73—207                                                    4 Claims

ABSTRACT OF THE DISCLOSURE

A flowmeter is provided with a spring urging the valve member towards a seating at the smaller inlet end of a flow passage, so as to be suitable for use in any disposition or for measuring flows under high pressures, and the valve member is carried by a plunger including opposed magnets by means of which a pointer is moved over a scale without any mechanical connection with the valve member, thereby enabling the pointer and scale to have a mounting rotatable about the axis of the plunger to bring the scale to a convenient position for reading regardless of the disposition of the flowmeter.

---

This invention relates to flowmeters and has for its object the provision of a flowmeter particularly suitable for high-pressure fluids capable of operating in any attitude.

According to the present invention, a flowmeter comprises an inlet leading to the smaller diameter end of a tapered passage leading to the outlet, a seating at the smaller end of the tapered passage facing towards the larger end, a valve member urged towards the seating by a spring, and means associated with the valve member to move a pointer over a scale calibrated in accordance with the flow of fluid through the tapered passage for corresponding positions of the valve member spaced from the seating.

The spring serves to urge the valve member towards its seating regardless of the attitude of the flowmeter. As the flowmeter is primarily intended for high-pressure fluids, the weight of the valve member (and of any parts carried by it) can be regarded as negigible compared with the loading of the spring, so that there will be no appreciable difference between a reading taken with the flowmeter in a position in which the weight of the valve member acts in the same direction as the spring-urge and a reading taken with the flowmeter in a position in which the weight of the valve members acts in opposition to the spring-urge.

The scale and pointer are preferably in a dial casing mounted so as to be rotatable to a convenient position for reading, regardless of the attitude of the flowmeter; thus the valve member is preferably provided with a coaxial plunger slidable in a barrel on which the dial casing is rotatably mounted, the plunger houses a pair of bar magnets end-to-end with the adjacent poles of like polarity but spaced from each other, and the pointer is made of ferromagnetic material and is disposed transversely of the barrel so as to be constrained by the like spaced adjacent poles to move over the scale in accordance with movement of the plunger and magnets with the valve member. There is therefore no mechanical link between the valve member and the pointer to interfere with the rotation of the scale and pointer to any position round the sleeve. The dial casing is preferably secured in selected position by a pair of nuts on screw-threaded portions of the barrel and bearing one against each end of a sleeve carrying the dial casing, this arrangement also allowing endwise adjustment of the sleeve on the barrel for presetting the pointer correctly with respect to the scale.

The tapered passage is preferably provided in a cylindrical insert which is replaceable or interchangeable, and the tapered passage preferably has two cone angles, with the first angle (adjacent the seating) sharper than the second, so as to ensure a reasonably constant degree of accuracy as between small and large rates of flow.

The seating is preferably provided with small by-pass passages, so that if the fluid supply is connected to the outlet in mistake for the inlet there will be a slight discharge from the inlet to safeguard the flowmeter from damage.

The barrel preferably has a closed end remote from the valve member, so that there cannot be any leakage from the flowmeter through the barrel, and the plunger has a non-circular cross-section, e.g., hexagonal, so that there cannot be any build-up of pressure or vacuum between it and the closed end of the barrel.

One embodiment of the invention will now be described, by way of example only, with reference to the accompanying drawings, in which:

FIG. 1 is a longitudinal section taken generally from the line 1—1 of FIG. 2, but with a dial casing seen in elevation above the section and with part of the cover plate removed below the section; and FIG. 2 is an elevation from the right-hand side of FIG. 1, with the closed end of the barrel in section.

The flowmeter has a hollow body 1 counterbored at one end 2 to receive a cylindrical insert 3, which is held in place by an end cover 4 having a spigot 5 and sealing ring 6 fitting the counterbore and secured to the body by screws 7. The end cover 4 has an inlet 8 and the body 1 has an outlet 9, and the end cover and the body each have a tapped hole 10 for mounting screws (not shown). The end of the spigot 5 forms a seating 11 for a valve member 12 at the smaller end of a tapered passage 13 in the insert 3, and a plunger 14, coaxial with the valve member, has a hexagonal cross-section and is slidable in a barrel 15, one end 16 of which is closed and the other end 17 of which is threaded to screw into a tapped bore 18 coaxial with the counterbore 2. A helical compression spring 19 surrounds the plunger 14 between the valve member 12 and the end 17 of the barrel 15.

Small by-pass passages 20 cut through the seating 11 on the spigot 5.

The threaded portion 21 on the end 17 of the barrel 15 extends back from the body 1 and the barrel is provided with another threaded portion 22 towards the closed end 16, to enable a pair of locknuts 23, 24 to locate and secure on the barrel a sleeve 25 carrying a dial casing 26, which has a window 27 in its cover plate 28 through which a scale 29 can be seen and an indicator pointer 30 observed. The pointer is pivoted at the opposite side of the barrel to the scale and is made of ferromagnetic material so as to be constrained to move over the scale in accordance with movement of the plunger 14 by the like adjacent poles of a pair of bar magnets 31 spaced apart end-to-end within the plunger.

With the inlet 8 connected to a fluid, e.g., water, supply pipe (not shown) and a delivery pipe (also not shown) is connected to the outlet 9, the flow of water will be measured in the following manner. For a very small flow, say less than 0.5 gallon per minute (g.p.m.), the water will pass through the by-pass passages 20 without disturbing the valve member 12 but as the flow is increased the valve member will be displaced from its seating 11, against the urge of the spring 19, by the pressure of the flow until the valve member reaches a position in which the annular space between it and the tapered passage 13 in the insert 3 permits a flow creating a pressure drop across the valve member just balancing the loading of the spring 19. As the plunger 14 moves with the valve member 12 the like adjacent poles of the bar magnets 31 constrain the pointer 30 to move accordingly over the scale 29, which is calibrated appropriately to the angle of taper of the passage 13 and the rating of the spring 19. Although not apparent in FIG. 1, the tapered passage 13 has two cone angles, with the first angle (adjacent the seating 11) slightly sharper than the second so as to ensure a reasonably constant degree of accuracy as between small rates of flow (e.g., 0.5 to 2.0 g.p.m.) and large rates of flow (e.g., 6 g.p.m. upwards).

The closed end 16 of the barrel 15 prevents any leakage from the flowmeter through the barrel, and the hexagonal cross-section of the plunger prevents any build-up of pressure or vacuum between it and the closed end of the barrel.

As the supply pipe may be extending in any direction, the flowmeter may have to assume any attitude, including—but not necessarily—that of FIG. 1 with the plunger 14 horizontal. As the flowmeter is intended for high-pressure fluids, the weight of the valve member 12 and plunger 14 (with magnets 31) can be regarded as negligible compared with the loading of the spring 19, so that there will be no appreciable difference between a reading taken with the flowmeter in a position in which the weight of the valve member etc. acts in the same direction as the spring 19 (i.e., with the plunger vertical and the closed end 16 of the barrel 15 uppermost) and a reading taken with the flowmeter in a position in which the weight of the valve member etc. acts in opposition to the spring (i.e., with the closed end 16 of the barrel 15 lowermost). Whatever the attitude of the flowmeter, the dial casing 26 can be brought to a position in which the window 27 is disposed conveniently for reading the scale 29 simply by slackening the locknut 24 (the locknut 23 having been secured by a grubscrew 32 after presetting the pointer correctly with respect to the scale), rotating the sleeve 25 and casing 26 on the barrel 15, and then tightening the locknut 24 against the sleeve.

If, by mistake, the supply pipe connected to the outlet 9, the flowmeter will be safeguarded from damage by the by-pass passages permitting flow in the reverse direction, but the mistake will be revealed by the inability to increase the rate of flow appreciably or to get any reading on the scale 29.

What we claim is:

1. A flowmeter having an inlet and an outlet, a tapered passage between the inlet and the outlet with the smaller end of the passage towards the inlet, a valve member movable away from the inlet end of the tapered passage by fluid flowing from the inlet to the outlet, a pointer movable in consequence of movement of the valve member, and a scale over which the pointer is movable calibrated in accordance with the flow of fluid through the tapered passage for corresponding positions of the valve member from the inlet end, an annular seating for the valve member at the inlet end of the tapered passage, a spring urging the valve member towards the seating, a dial casing for the scale and pointer, means for mounting said dial casing so as to be rotatable to a convenient position for reading, regardless of the attitude of the flowmeter, said valve member being provided with a coaxial plunger slidable within said mounting means, said mounting means including a barrel on which the dial casing is rotatably mounted, a pair of bar magnets housed by said plunger in end-to-end relationship with the adjacent poles of like polarity but spaced from each other, and the pointer is made of ferromagnetic material and is disposed transversely of the barrel so as to be constrained by the like spaced adjacent poles to move over the scale in accordance with movement of the plunger and magnets with said valve member.

2. A flowmeter as in claim 1, wherein the dial casing is screwed in selected position by a pair of nuts on screw-threaded portions of the barrel and bearing one against each end of a sleeve carrying the dial casing.

3. A flowmeter as in claim 2, wherein the barrel has a closed end remote from the valve member.

4. A flowmeter having an inlet and an outlet, a tapered passage between the inlet and the outlet with the smaller end of the passage towards the inlet, a valve member movable away from the inlet end of the tapered passage by fluid flowing from the inlet to the outlet, a pointer movable in consequence of movement of the valve member, and a scale over which the pointer is movable calibrated in accordance with the flow of fluid through the tapered passage for corresponding positions of the valve member from the inlet end, an annular seating for the valve member at the inlet end of the tapered passage, a spring urging the valve member towards the seating, said seating being provided with small by-pass passages.

References Cited
UNITED STATES PATENTS

| 2,069,309 | 2/1937 | Henszey | 73—208 |
| 2,076,562 | 4/1937 | Heidbrink | 73—209 |
| 3,315,523 | 4/1967 | Conkling | 73—209 |
| 1,965,333 | 7/1934 | Connell | 73—209 |

JERRY W. MYRACLE, Primary Examiner

U.S. Cl. X.R.

73—228